June 20, 1961  J. M. PETTIT  2,989,744
FALSE ECHO TRANSMITTER
Filed Aug. 5, 1952  3 Sheets-Sheet 1

INVENTOR.
JOSEPH M. PETTIT
BY
Harry M. Saragovitz
ATTORNEY

June 20, 1961  J. M. PETTIT  2,989,744
FALSE ECHO TRANSMITTER
Filed Aug. 5, 1952  3 Sheets-Sheet 2

INVENTOR.
JOSEPH M. PETTIT
BY
Harry M. Saragovitz
ATTORNEY

June 20, 1961 J. M. PETTIT 2,989,744
FALSE ECHO TRANSMITTER
Filed Aug. 5, 1952 3 Sheets-Sheet 3
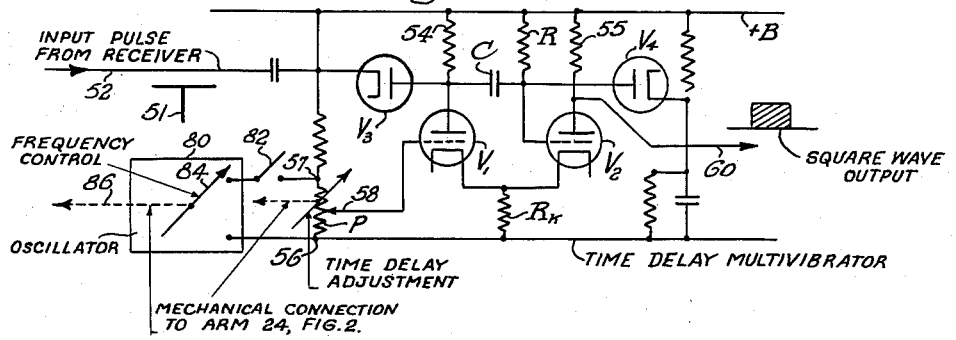
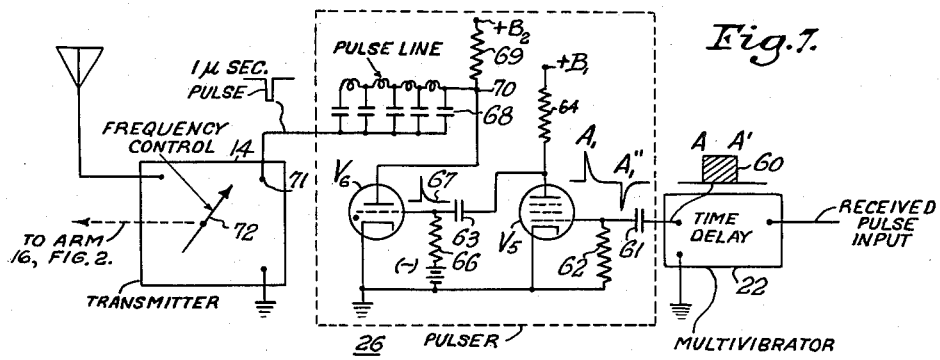
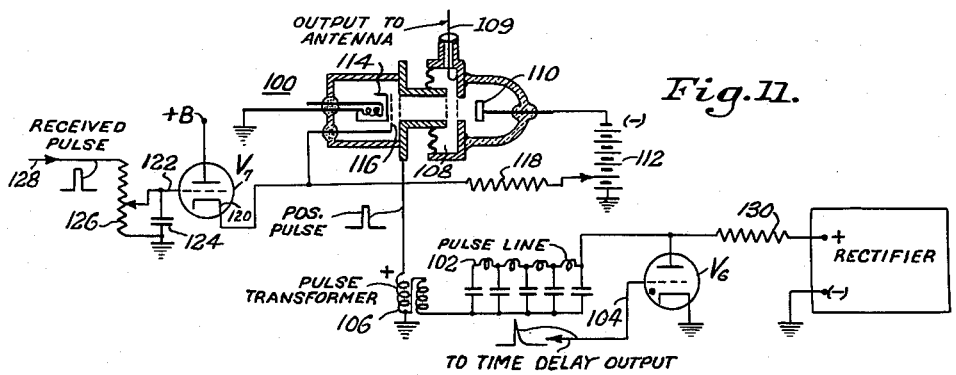
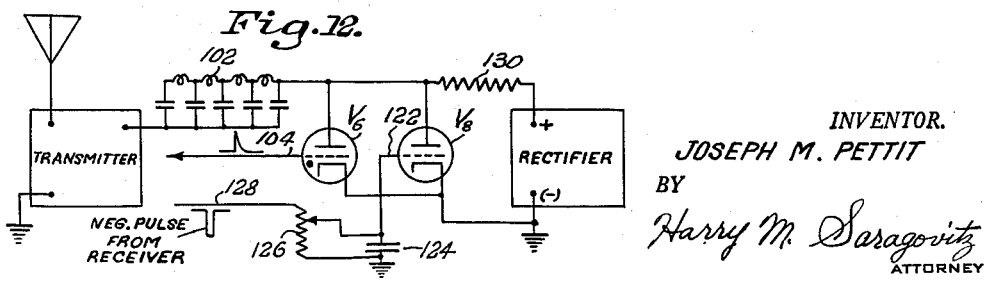
INVENTOR.
JOSEPH M. PETTIT
BY
Harry M. Saragovitz
ATTORNEY United States Patent Office 2,989,744
Patented June 20, 1961

2,989,744
FALSE ECHO TRANSMITTER
Joseph M. Pettit, Menlo Park, Calif., assignor to the United States of America as represented by the Secretary of the Army
Filed Aug. 5, 1952, Ser. No. 302,657
14 Claims. (Cl. 343—18)

The present invention relates to apparatus for transmitting a false echo pulse for deceiving enemy radar operators. The device is intended primarily to be carried on aircraft and is adapted to transmit radio pulses of the same frequency and pulse repetition rate as the enemy radar set whose exploratory pulses are being received. According to the invention, the airborne operator tunes his receiver to the frequency of the incoming pulses and simultaneously adjusts his local transmitter tuning to the same frequency. The airborne operator then adjusts a sharply tuned band-pass filter to pass the enemy pulse repetition frequency. The received pulses are delayed in time by a suitable interval and utilized to activate a local transmitter which emits delayed radio pulses. These re-transmitted pulses, when received by the enemy radar set are timed to appear to the enemy operator as reflections from an object nearer to the enemy radar set than the plane carrying the apparatus actually is.

The object of the invention, therefore, is to provide an airborne apparatus adapted to receive enemy radar pulses and re-transmit the same, after suitable delay, so as to deceive the enemy operator as to the true distance of the airborne apparatus.

This and other objects will appear from the following description taken in connection with the accompanying drawings which are illustrative of the invention.

FIGURE 5 is a diagram showing one type of variable time delay multivibrator.

FIGURE 7 is a diagram showing one method of generating delayed pulses suitable for energizing the transmitter.

FIGURE 11 is a diagram of a modification of the invention where the retransmitted signal is varied automatically in accordance with the amplitude of the received signal.

FIGURE 12 is a diagram of a modification of FIGURE 11.

Figure 1:
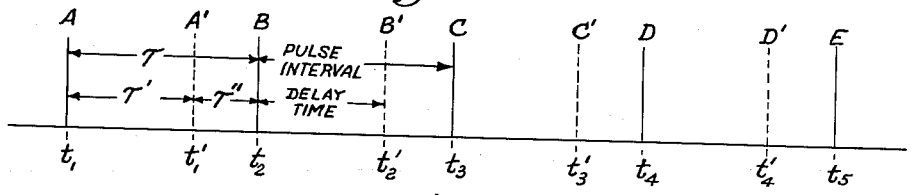
FIGURE 1 is a diagram showing the time spacing of the enemy radar pulses as received by the airborne device, together with the time position of the re-transmitted pulses.
Figure 2:
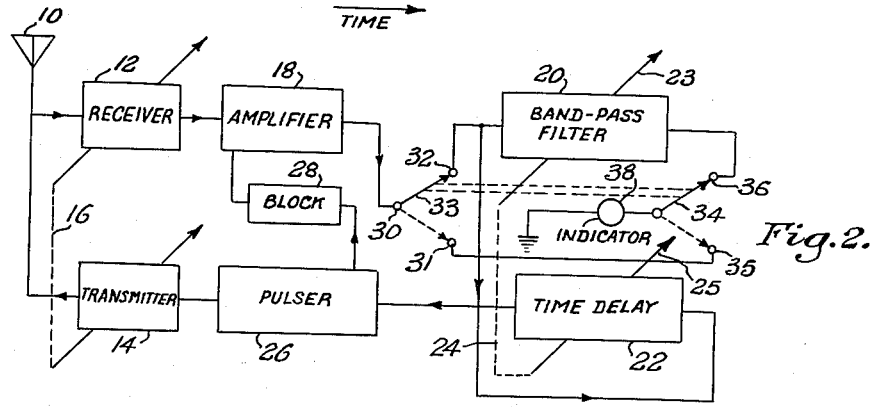
FIGURE 2 is a block diagram of the essential components of the device.

Referring now to FIGURE 2, the airborne device, which is the subject of this invention, includes an antenna 10, a tunable receiver 12, a corresponding tunable transmitter 14, tuned to the same frequency as the receiver by the mechanical connection 16, and associated apparatus presently to be described. The airborne operator searches the radio spectrum by varying the tuning of the receiver and may pick up the pulses of an enemy radar transmitter. These received pulses, for purposes of explanation, may be plotted as in the diagram FIGURE 1, where the horizontal axis represents time. The vertical lines A, B, C, D, E, represent received pulses occurring at instants $t_1$, $t_2$, $t_3$, . . . separated by a time interval $\tau$ determined by the pulse repetition rate of the enemy transmitter. It is the primary object of the invention to send out transmitted pulses such as A', B', C', . . . at instants $t_1'$, $t_2'$, $t_3'$, . . . having the same time interval $\tau$ and pulse repetition rate as the received pulses; each transmitted pulse A', B', C', D', E', being delayed behind the corresponding previously received pulses A, B, C, D, . . . by a time interval $\tau'$. The delay time $\tau'$ is made somewhat less than the received pulse interval $\tau$. The re-transmitted pulses A', B', C', D', . . . are made somewhat stronger than the received pulses A, B, C, D, . . .; normally reflected by the body of the airplane. The result as observed on the enemy range oscilloscope is the appearance of the false pulses A', B', C', D', . . ., at a range position nearer the enemy set than the normally reflected pulses A, B, C, D, . . ., by a distance corresponding to the time separation $\tau''$ between A' and B. The enemy operator is therefore misled into supposing that the range of the plane carrying the device is less than the true distance.

Figure 3:
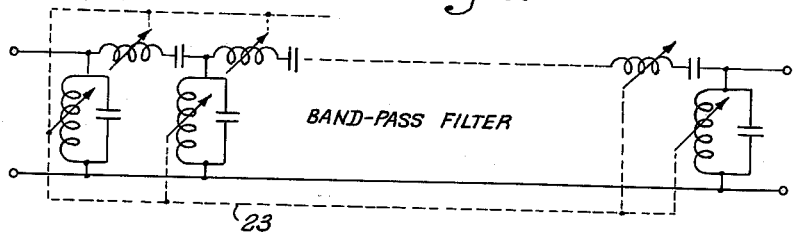
FIGURE 3 is a schematic diagram of an adjustable band-pass filter tunable to pass the pulse repetition frequency.

The method and apparatus for accomplishing this result will now be described. The output of the radio receiver 12 is amplified by the amplifier and detector 18, and the pulse output is delivered to the common point 30 of a two position switch 33. In the switch position shown the rectified pulse output is fed into the input of an adjustable sharply tuned band pass filter 20 of a type shown in FIGURE 3. The filter must be capable of adjustment to pass any pulse repetition frequency which the enemy transmitter may emit. This requires the filter to be adjustable over a range of the order of 400 to 2000 cycles. To accomplish this, the inductance coils of the filter elements, shown diagrammatically in FIGURE 3, may be provided with a plurality of taps connected to the contacts of a rotary switch, the elements being all ganged together on a common axis and tuned by the movement of a single control 23, FIGURE 2. The filter output lead is connected to switch contact 36, thence by switch arm 34 to indicator 38 and ground. The indicator may be of any preferred type, such as an ammeter, vacuum tube voltmeter, cathode ray oscilloscope or the like. When the radio spectrum is being explored to pick up enemy radar pulses, the switch arms 33 and 34 are thrown to the downward position on the diagram connecting the amplifier output to contacts 31 and 35 respectively thence to indicator 38 and ground, thus bypassing the filter. The receiver is first adjusted until indicator 38 gives a maximum indication. Switch 33—34 is then thrown to the upward position which connects the filter in circuit with the indicator. The filter tuning adjustment 23 is then varied until the indicator again reads a maximum. The filter is thus tuned to pass the pulse repetition frequency.

Figure 4:
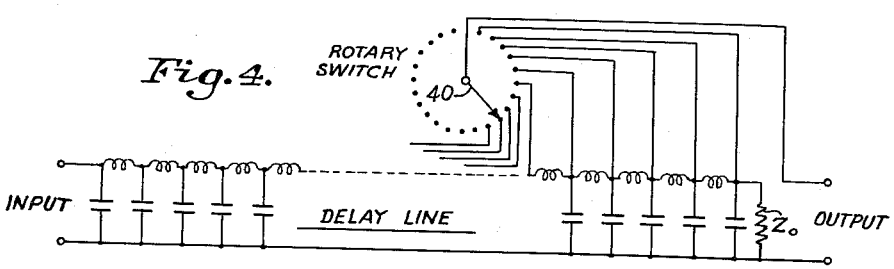
FIGURE 4 is a schematic diagram of an adjustable delay line.

The position of the tuning adjustment arm 23 of the band-pass filter is a measure of the pulse repetition frequency and thus of the interval between pulses. According to the invention each received pulse must be followed by a transmitted pulse delayed by an interval less than the interval between received pulses. A delay device 22 is connected to filter input terminal 32 to receive incoming pulses. The time delay device is adjusted in accordance with the received pulse interval by the mechanical connection 24 joined to the band-pass filter adjustment 23 and arm 25 of the time delay device. The pulse duration may be of the order of 1 or 2 microseconds. Received pulses, after amplification, may be squared up by devices known in the art and introduced into an artificial line which may serve as one form of delay device. The delay time of the whole line may be of the order of 2500 microseconds and of a type capable of adjustment in accordance with the pulse repetition frequency being received. In order to avoid serious distortion of the pulse, such a delay line should have a large number of sections, preferably of the order of 50 to 100 and be terminated in its characteristic impedance. The line may be of conventional design as indicated schematically in FIGURE 4. Taps may be brought out from each line section to the contacts of a suitable tap switch as shown. The delayed pulse potential may be taken off at any desired point on the line by adjustment of the switch arm 40.

Figure 6:
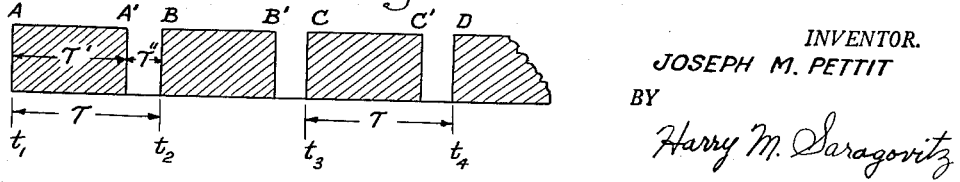
FIGURE 6 is a diagram showing rectangular waves produced by a variable delay multivibrator used in one method of obtaining delayed pulses.

An alternative delay device may be provided by a multivibrator such as shown diagrammatically in FIGURE 5 and which generates square waves of adjustable length as shown in the diagram FIGURE 6. In this case the received pulses are indicated by A, B, C, D . . . which arrive at times $t_1$, $t_2$, $t_3$, and $t_4$ having a pulse interval $\tau$ as in FIGURE 1. The received pulse A FIGURE 6 may be applied to the input lead 52 of the multivibrator of FIGURE 5 which generates square waves AA', BB', CC'. The cut-off points A', B', C' . . . occur after a time delay time $\tau'$, the output voltage falling off abruptly to zero. The trailing edges A', B', C' . . . are used to initiate short radio pulses in the local transmitter of the same radio frequency as the pulses received from the enemy transmitter and having a duration of the order of 1 microsecond. The abrupt termination of the square wave generated by the multivibrator gives this device an advantage over the delay line in that the trailing edge of the output pulse falls abruptly to zero, whereas the delay line, unless provided with a large number of sections, gives a trailing edge which falls off rather slowly and suffers distortion somewhat like telegraph pulses in a submarine cable.

The multivibrator shown diagrammatically in FIGURE 5 is of a type suitable for generating a single rectangular wave for each received pulse. It is provided with means for adjusting the time duration of the wave. Such devices are well known in the art and require little description here. The multivibrator tubes $V_1$ and $V_2$ have a common cathode resistor $Rk$; the usual plate resistors 54 and 55; a timing condenser C, and a timing resistor R. Diode $V_4$ is used to define the initial grid potential of triode $V_2$. In the normal stable condition $V_2$ is conducting and $V_1$ is cut off. A negative triggering pulse 51 is applied at input lead 52 which causes $V_2$ to cut off and $V_1$ to conduct. The duration of this condition is determined by timing condenser C, timing resistor R and the setting of bias potentiometer 58. The rectangular wave output is taken off at lead 60 connected to the plate of $V_2$. The time duration of the rectangular wave may be varied from almost zero to full value by varying potentiometer 58.

The adjusting arm of potentiometer 58 may be connected mechanically to arm 23 of the band-pass filter as shown diagrammatically at 24 FIGURE 2. With this arrangement, the operator automatically adjusts the delay time $\tau'$ of the re-transmitted pulse A' of FIGURE 1, during the process of adjusting the arm of the band-pass filter for maximum response as previously described. It will be appreciated that the process of tuning the band-pass filter for a maximum response of the output indicator determines the time interval $\tau$ between received pulses and that the delay time $\tau'$ of the multivibrator may be made less than $\tau$ by any amount desired by proper design of potentiometer P and the mechanical connection of the adjustable contact arm 58.

The function of pulser 26 of FIGURE 2 is to receive the delayed signal from the delay device 22 and supply an output pulse of sufficient power to energize the local transmitter. When the preferred type of delay device is a multivibrator, the pulser is required to pulse the transmitter at the instant represented by the trailing edges A', B', C', . . . of the rectangular pulses shown in FIGURE 6. This may be accomplished as shown in FIGURE 7. The rectangular output wave 60 of the multivibrator is applied to the grid of an inverter tube $V_5$ through a small coupling condenser 61 and grid biasing resistor 62. Tube $V_5$ is biased to be normally conducting. The leading edge A of the rectangular wave produces the sharp positive pulse A1 on the grid side of condenser 61 by the differentiating action of the condenser resistance combination 61, 62. The trailing edge A' of the wave produces the sharp negative pulse $A_1''$. The positive pulse $A_1$ produces no appreciable effect on the plate current on account of saturation and the plate potential continues at a minimum owing to the drop in plate resistor 64. The negative grid pulse $A_1''$ momentarily cuts off $V_5$ thereby applying a positive initiating pulse 67 to the grid of thyratron gas tube $V_6$ causing it to discharge the pulse forming line 68 which has been slowly charged up through charging resistor 69 from a suitable source of positive potential $+B_2$. The ignition of gas tube $V_6$ connects the positive terminal 70 of the pulse forming line to ground thereby discharging the line to ground through the transmitting oscillator 14 by way of terminal 71. The duration of the pulse is determined by the constants of the pulse line and is made preferably of the order of 1 microsecond. Transmitter 14 generates radio frequencies which match those received from enemy radar sets. These may be taken roughly as falling within the band 3000 to 10,000 megacycles. A type of oscillator suitable for generating such frequencies and of sufficient power to simulate reflected waves is the reflex klystron. These devices are commonly available with tuning adjustable over a range of 3000 to 5000 and 5000 to 10,000 megacycles. The desired frequency range may thus be covered by a set of two tubes.

A beat frequency oscillator is required in the receiver to heterodyne the incoming radar pulses. A klystron oscillator of the same type used for producing the re-transmitted pulses may be used for this purpose. This makes it convenient to mechanically interconnect the receiver tuning controls with the transmitter frequency control so that the re-transmitted pulse will have the same frequency as the received signal.

A receiver suppression circuit, shown as "Block 28" of FIGURE 2 is provided to block the receiver channel during the active pulse interval of transmitter 14. This is done to avoid the possibility of self oscillation in the system from feed-back through the path from the receiver to band-pass filter, time delay circuit, transmitter and back to the receiver. The blocking circuit may include a one shot multivibrator of suitably short interval energized from the output of the time delay circuit and connected to bias the grid of any tube in the receiver channel beyond cut-off. The blocking circuit 28 of FIGURE 2 is shown schematically connected to an amplifier section of the receiver.

The invention may be modified and applied in various ways as will be apparent to those skilled in the art. While the length of the time delay provided by the multivibrator FIGURE 5 may be varied by the mechanical adjustment of potentiometer arm 58 as described, the adjustment may be made electrically, so that the time position of the re-transmitted pulse A' of FIGURE 1 may be made to vary rhythmically according to any desired law. This may be accomplished by providing an oscillator 80 FIGURE 5 which may be synchronized with the received pulses by connecting frequency control arm 84 of the oscillator to arm 24 of FIGURE 2 by mechanical connection 86. The oscillator is adapted to generate square waves of alternately positive and negative polarity as shown diagrammatically in FIGURE 8a. The details of this oscillator need not be described here as being within the skill of the art. The output of oscillator 80 may be superposed on potentiometer P at terminals 56 and 57 through switch 82. The potentiometer arm 58 may be adjusted to bring the delay time represented by $A'_0$ (with the oscillator disconnected by switch 82) a little beyond the mid-point between A and B as shown. When switch 82 is closed, the positive half-wave will cause the multivibrator to generate a pulse A—$A'_1$, FIGURE 8c, longer than A—$A'_0$. When the next pulse is initiated at instant B, the polarity of the square wave has reversed. This is equivalent to a negative shift of potentiometer arm 58. The multivibrator therefore generates a short pulse such as shown at B—$B'_1$ FIGURE 8c. The re-transmitted pulses $A'_1$, $B'_1$, $C'_1$ . . . are displaced alternately on either side of the successive reference positions $A'_0$, $B'_0$, $C'_0$. This tends to mislead the enemy operator into assuming the existence of two reflecting objects, FIG. 8d illustrating the relative delays caused by operation of the oscillator.

Figure 8:
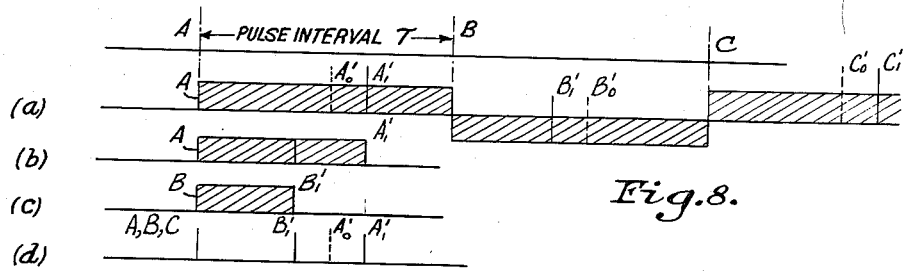
FIGURE 8 is a diagram showing a method of emitting two transmitted pulses for each received pulse, alternately delayed a longer and a shorter time than the average delay time of the multivibrator.
Figure 9:
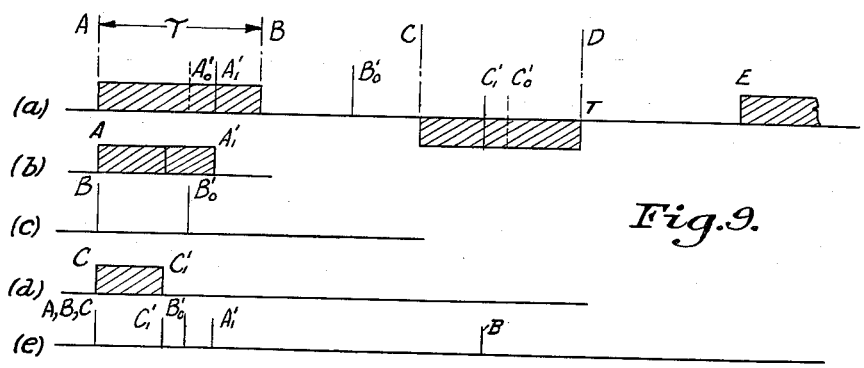
FIGURE 9 is a diagram showing a method of generating three pulses having different delay times for each received pulse.

The pulse $A'_0$, missing in FIGURE 8d, may be developed by using a generator having the wave form shown in FIGURE 9a. In the interval B—C the oscillator voltage is zero; hence the false echo $B'_0$ FIGURE 9c has the normal delay corresponding to the initially fixed position of potentiometer arm 58; that is, the delay represented by A—$A'_0$ of FIGURE 8a. The delay pulse initiated at instant A is shown as A—$A'_1$ FIGURE 9b. The delay pulse initiated at instant C is shown in FIGURE 9d as $C'_1$. FIG. 9e illustrates the relative delays caused by operation of the oscillator.

The method of multiplying the number of false echoes just described may be further modified so as to increase their number almost indefinitely by substituting a sine wave generator for the square wave generator and by selecting a frequency which is a submultiple of the pulse repetition frequency.

Figure 10:
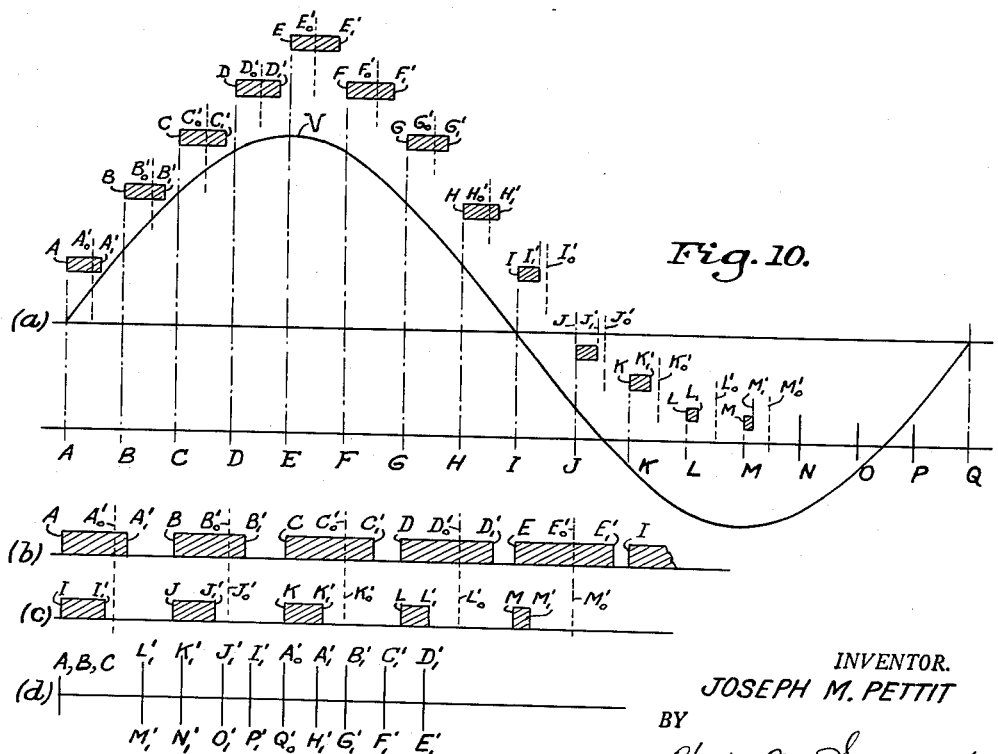
FIGURE 10 is a diagram showing a method of generating a plurality of differently delayed pulses using a sine wave whose frequency is a submultiple of the pulse repetition frequency.

Referring now to FIGURE 10a, the points A, B, C, . . . Q represent instants of time at which enemy radar pulses are received with reference to the sine wave potential U. At each of these instants a multivibrator delay cycle is initiated by the received pulses. The sine wave potential generated by oscillator 80 of FIGURE 5, is impressed across the multivibrator potentiometer P at terminals 56 and 57 as before. The normal time delay A—$A'_0$ falls somewhat beyond the mid-point between A and B as before. The increased time delay due to the superimposed sine wave potential for the interval A—$A'_1$ is $A'_0$—$A'_1$. This effect is shown to a larger scale in FIGURE 10b where the rectangle A—$A'_1$ represents the square wave output of the multivibrator including the effect of the superimposed generator voltage which would otherwise be A—$A'_0$. At the point B a second received radar pulse initiates the time delay interval B—$B'_0$. The increased bias potential due to the increased amplitude of the sine wave extends the duration of the pulse to $B'_1$. Similarly the signals at C, D, and E initiate time delay rectangles terminating at $C'_1$, $D'_1$, and $E'_1$ which mark the instants at which re-transmitted pulses are emitted. The positions of the re-transmitted pulses relative to A—$A'_0$ and A, B. C . . . drawn to a still larger scale are shown in FIGURE 10d as $A'_1$, $B'_1$, $C'_1$, $D'_1$. As time advances, delay times are initiated at instants E, F, G, H, and which terminate at instants $E'_1$, $F'_1$, $G'_1$, $H'_1$, which fall substantially over instants $D'_1$, $C'_1$, $B'_1$, $A'_1$ as shown and lie to the right of $A'_0$. As time continues to advance the polarity of the sine wave reverses. The delay times are then initiated at instants I, J, K, L, which terminate at instants $I'_1$, $J'_1$, $K'_1$, $L'_1$, and all fall short of $A'_0$ and lie as shown in FIGURE 10c symmetrically to the left of $A'_0$; the pulses from the remaining quarter of the wave are initiated at instants M, N, O, P, and terminate substantially coincident with $L'_1$, $K'_1$, $J'_1$, $I'_1$ as shown in FIGURE 10d. The result is a line spectrum substantially symmetrical about the point $A'_0$ and lying between A and B.

If the frequency of the bias potential wave is not an exact submultiple of the pulse repetition rate the spectral lines will not remain in fixed positions but will shift progressively forward or backward from instant to instant. This condition as well as the display of fixed spectral lines on the enemy's cathode ray oscilloscope may still further confuse the enemy radar operator.

In the various modifications of the device so far described, the amplitude of the re-transmitted pulse is constant regardless of the strength of the received pulses. In order to more completely simulate a reflected pulse, the strength of the transmitted pulse should be varied in proportion to the amplitude of the received signal. This may be accomplished manually by varying the voltage applied to the transmitter in proportion to the measured strength of the received signal. The re-transmitted signal may also be varied automatically in accordance with the amplitude of the received signal by the combination shown in FIGURE 11. A reflex klystron oscillator, indicated generally by numeral 100, is energized from the pulse line 102 in accordance with pulses applied to the grid of gas tube $V_6$ as described for FIGURE 7. Positive pulses are applied to the klystron cavity resonator 108 through pulse transformer 106. The repeller electrode 110 is excited from a source of negative potential 112 in accordance with usual practice. The cathode 114 is connected to ground and grid 116 is connected through bias resistor 118 to a suitable point of negative potential in source 112. Cathode 120 of triode $V_7$ is connected to klystron grid 116. Triode grid 122 is excited through potentiometer 126 by positive pulses from the output of amplifier 18 of FIGURE 2 through lead 128. A condenser 124 is bridged from grid 122 to ground and of suitable capacity to provide the desired potential for klystron grid 116 at the instant the re-transmitted power pulse is applied to resonator 108.

It should be apparent from the structure as described, that the delayed pulses applied to the grid of tube $V_6$ initiate the discharge of the pulse line 102 which applies positive pulse excitation to cavity resonator 108 thereby generating high frequency oscillations, the energy being led off by lead 109 to antenna 10 of FIGURE 2. It will also be apparent from the structure described that the intensity of these oscillations is varied automatically in accordance with the strength of the received signals since the received pulses themselves are utilized to vary the bias of the control grid of the klystron oscillator. Thus for example, if the strength of the received pulses is increased, the bias of grid 122 of tube $V_7$ is made more positive, which in turn draws more plate current from potential source +B, and which passing through bias resistor 118 makes the potential of klystron control grid 116 more positive, thereby proportionately increasing the strength of the oscillations in resonator 108. Thus if the enemy operator, suspecting the existence of the false pulses, varies the strength of his transmitted pulses, the false pulses will automatically vary in proportion just as they would if a real reflecting object were present in the field of radiation of his radar set, thus making it difficult for him to discover the true conditions.

The same result may be obtained by the combinations shown in FIGURE 12 which includes the same main elements as in FIGURE 11 and are identified by the same numerals. A triode $V_8$ is bridged across the power supply beyond the input resistance 130. Grid 122 is connected to the output of the receiver of FIGURE 2, so that negative pulses are applied to the grid. When the received pulses increase in amplitude the bias of grid 122 is made more negative. This draws less current through resistor 130 thereby increasing the potential to which the condensers of pulse forming line 102 are charged. Thus when a positive pulse from the delay line is applied to grid lead 104 of the tube V₆ to initiate the discharge of the pulse forming line, a higher voltage pulse is applied to the transmitter oscillator. The re-transmitted pulse is therefore varied in proportion to the amplitude of the received pulse. This method of varying the amplitude of the re-transmitted pulse may also be applied to the klystron oscillator circuit of FIGURE 11. It has the advantage of being applicable to oscillators having no control grid, such for example, as the magnetron. The loss incurred by shunting away some of the charging current supplied by the rectifier is not serious since the energy in the re-transmitted pulses is necessarily very small, and since, when maximum power is required the control tube V₈ is blocked, thus completely interrupting the diversion of shunt current.

Having described my invention, what I claim is:

1. A transponder conditioned to delay and re-transmit received pulse signals comprising, a pulse receiver, a transmitter adapted to emit short pulses, a tunable band-pass filter responsive to the output of said receiver including a movable tuning member and an indicator to indicate when the response is a maximum, means connected to the output of the receiver adapted to delay received pulses and having a delay control positioned by a connection to said tuning member, means responsive to the output of said delay means adapted to initiate a short pulse in the transmitter in response to each received pulse delayed a determined fraction of the interval between pulses, and means to block the receiver channel during each transmitted pulse, whereby the enemy radar station which emits the pulses received locally receives false echoes.

2. The device of claim 1 including means for automatically varying the strength of the transmitted pulses in accordance with the strength of the received pulses, said means including a connection from the output of said receiver to the control grid of the transmitter and adapted to control the bias thereof.

3. The device of claim 1 including means for automatically varying the strength of the transmitted pulses in accordance with the strength of the received pulses, said means including a vacuum tube having a control grid connected to the output of said pulse receiver, said tube being so connected to the source of transmitter potential supply as to vary the potential thereof.

4. The device of claim 1 including means for automatically varying the strength of the transmitted pulses in accordance with the strength of the received pulses, said means including vacuum tube means having a control grid and bridged across the source of transmitter power supply and adapted to vary the potential thereof, and a connection from said control grid to the output of said pulse receiver.

5. A transponder responsive to pulse signals and conditioned to delay and re-transmit received signals comprising, a receiver, a variable delay multivibrator responsive to received pulses having a movable delay control member, a pulser responsive to signals delayed by said multivibrator, a transmitter adapted to emit short pulses responsive to the output of the pulser and tuned to the same frequency as the received pulses, a second multivibrator connected to the receiver and activated by the output of said variable delay multivibrator and adapted to block the receiver when the transmitter is active, and means to adjust said delay multivibrator in accordance with a determinate fraction of the interval between pulses including a tunable narrow band-pass filter having a movable tuning member and an indicator to indicate when the response is a maximum thereby to pass the pulse repetition frequency of the received signal and a connection from said movable tuning member to said delay control member to determine the position thereof.

6. A device for emitting short radio pulses in response to received radar pulses so positioned in time with respect to the natural reflected pulses as to mislead an enemy operator as to the true range of the emitting device comprising, a receiver adapted to receive enemy radar pulses, time delay means having a movable delay control member adapted to delay said received pulses, a pulse transmitter, means responsive to the output pulses from said time delay means adapted to initiate pulses in said transmitter, tunable band-pass filter means having a movable tuning member and an indicator to indicate when the filter output is a maximum thereby determining the pulse repetition frequency of the received signals, a connection from said tuning member to said delay control member thereby adjusting said time delay to a substantial fraction of the interval between pulses, and means for blocking the receiver channel during the active period of the transmitter.

7. A transceiver adapted to receive pulses and re-emit the same after a suitable time delay comprising, a pulse receiver, a pulse transmitter, a variable time delay multivibrator adapted to generate rectangular waves initiated by received pulses, a pulser responsive to the trailing edge of said rectangular waves and a connection from said pulser output to the transmitter whereby a single delayed pulse is emitted following each received pulse the time delay being a substantial fraction of the interval between received pulses, means for adjusting the multivibrator time delay in accordance with the interval betwen received pulses, and means for blocking the receiver during the active period of the transmitter, said time delay adjusting means comprising a band-pass filter having mechanically adjustable components ganged together on a single control and an indicator to indicate when the filter is in tune with pulse repetition frequency, said time delay multivibrator including a time adjusting potentiometer having a movable member and connected in a timing circuit thereof, and a mechanical connection between said potentiometer and said band-pass filter control.

8. A device for re-emitting received radar pulses so delayed in time as to appear on a radar oscilloscope as reflections from an object closer to the radar set than the re-emitting device comprising, a receiver tunable over a frequency band of appreciable width, a pulse transmitter tunable over the same band width, an adjustable delay line connected to the receiver output having a time delay of the order of the longest pulse interval to be received, including switching means having contacts connected to the respective line sections and a movable contact arm associated therewith to pick off the received pulse at the desired time delay, a pulser adapted to generate a short pulse in response to each delayed received pulse and connected to the transmitter to activate the same, means to adjust the time delay in accordance with the received pulse repetition frequency, and means to block the receiver when the transmitter is active, said time delay adjusting means including a tunable narrow band-pass filter having a tuning member and an indicator to indicate when the filter is in tune thereby to determine the pulse repetition frequency, and a connection from said filter tuning member to said delay line movable contact arm whereby said transmitter is adjusted to emit pulses responsive to the received pulses delayed a determinate fraction of the interval between pulses.

9. A transponder device for emitting a time delayed pulse in response to each of a series of received pulses comprising, a receiver tunable to the frequency to be received, a transmitter tuned to the same frequency by a common control, a variable time delay multivibrator adapted to generate square waves and having a potentiometer for adjusting the time delay of the trailing edge of the output waves band-pass filter means tunable to the pulse repetition frequency including an indicator to determine the tuning thereof, and a connection from the filter tuning to said potentiometer to adjust said time delay in accordance with the pulse repetition frequency, a pulser adapted to generate short pulses triggered by the trailing edges of said rectangular waves, means for blocking the receiver when the transmitter is active, and means for alternately increasing and decreasing said time delay at each successive pulse received, said alternate delay means including a square wave generator connected to the aforesaid time delay potentiometer adapted to generate alternate positive and negative waves synchronized with the pulse repetition frequency of the received pulses, whereby the delayed pulses are transmitted at delay times alternately greater and less than the mean time delay.

10. A transponder device for emitting a time delayed pulse in response to each of a series of received pulses comprising, a receiver tunable to the frequency to be received, a transmitter tuned to the same frequency by a common control, a variable delay multivibrator adapted to generate rectangular waves and having a potentiometer for adjusting the time delay of the trailing edge of the output wave band-pass filter means tunable to the pulse repetition frequency including an indicator to determine the tuning thereof, and a connection from the filter tuning to said potentiometer to adjust said time delay in accordance wih the pulse repetition frequency, a pulser adapted to generate short pulses triggered by the trailing edge of said rectangular wave, a second multivibrator synchronized with the received pulses and adapted to generate alternate positive and negative rectangular waves with a dead interval therebetween, and a connection from the output of said second multivibrator to the aforesaid time delay potentiometer to superpose the output potential thereon, whereby the transmitter emits a pulse during said dead intervals having a time delay corresponding to the potentiometer setting and pulses having a time delay alternately longer and shorter than the aforesaid pulses.

11. A transponder device for emitting a time delayed pulse in response to each of a series of received pulses comprising, a receiver tunable to the frequency to be received, a transmitter tuned to the same frequency by a common control, a variable delay multivibrator adapted to generate rectangular waves and having a potentiometer for adjusting the time delay of the trailing edge of the output wave, a pulser adapted to generate short pulses triggered by the trailing edge of said rectangular wave, band-pass filter means tunable to the pulse repetition frequency including an indicator to determine the tuning thereof, and a connection from the filter tuning to said potentiometer to adjust said time delay in accordance with the pulse repetition frequency, a since wave generator synchronized with the received pulses and operating on a frequnecy which is a submultiple of the pulse repetition frequency, and a connection from the output of said generator to said time delay potentiometer to superpose said generator potential thereon, whereby the transmitter emits a plurality of pulses having a time delay progressively greater and less than that emitted when said generator potential is zero.

12. A transponder including a receiver adapted to receive pulse signals, a transmitter adapted to emit pulse signals of the same frequency as the received signals, adjustable time delay means responsive to received signals, means responsive to the output of said delay means adapted to initiate delayed pulse signals in the transmitter, tunable band-pass filter means including a tuning indicator to measure the pulse repetition frequency of the received signals, and means to adjust said time delay means in accordance with said pulse repetition frequency, including a connection from said band-pass filter tuning to the adjustment of said time delay means.

13. A transponder including a receiver tunable to pulse signals to be received, a transmitter tuned to the same frequency as the received signals, tunable band-pass filter means including a tuning indicator to measure the pulse repetition frequency of received signals; adjustable delay means positioned by a connection from said band-pass filter tuning, and means connected to said delay means to excite the transmitter to emit a pulse in response to each received pulse at an instant delayed in time by an appreciable fraction of the interval between pulses.

14. A transponder including a receiver tunable to pulse signals to be received, a transmitter tuned to the same frequency as the received signals, adjustable time delay means adapted to excite a pulse in said transmitter in response to each received pulse, and tunable band-pass filter means including a tuning indicator for adjusting said time delay means in accordance with the interval between pulses.

References Cited in the file of this patent

UNITED STATES PATENTS

| | | |
|---|---|---|
| 2,418,139 | Preisman | Apr. 1, 1947 |
| 2,440,253 | Dodington | Apr. 27, 1948 |
| 2,471,408 | Busignies | May 31, 1949 |
| 2,489,273 | Dodington | Nov. 29, 1949 |
| 2,530,418 | Alvarez | Nov. 21, 1950 |
| 2,561,363 | Haeff et al. | July 24, 1951 |

OTHER REFERENCES

Radio Amateur's Handbook, 1949 edition, pages 464–466, published by American Radio Relay League, West Hartford, Connecticut.